United States Patent
Ting

(10) Patent No.: US 7,319,891 B2
(45) Date of Patent: Jan. 15, 2008

(54) FOLDABLE CELLULAR PHONE

(75) Inventor: Jung-Feng Ting, Pingtung (TW)

(73) Assignee: BenQ Corporation, Taoyuan Shien (TW)

( * ) Notice: Subject to any disclaimer, the term of this patent is extended or adjusted under 35 U.S.C. 154(b) by 485 days.

(21) Appl. No.: 11/102,720

(22) Filed: Apr. 11, 2005

(65) Prior Publication Data

US 2005/0239522 A1 Oct. 27, 2005

(30) Foreign Application Priority Data

Apr. 12, 2004 (TW) .............................. 93110140 A

(51) Int. Cl.
*H04B 1/38* (2006.01)
(52) U.S. Cl. ............. 455/575.3; 455/90.3; 379/433.13; 16/330
(58) Field of Classification Search ..................... None
See application file for complete search history.

(56) References Cited

U.S. PATENT DOCUMENTS

| 5,185,790 | A  | * | 2/1993 | Mischneko | ............ | 379/433.13 |
| 7,096,537 | B2 | * | 8/2006 | Chen | ............................ | 16/327 |
| 7,215,981 | B2 | * | 5/2007 | Yang | ........................ | 455/575.3 |

FOREIGN PATENT DOCUMENTS

CN   2604850 Y   2/2004

* cited by examiner

*Primary Examiner*—Thanh Cong Le
(74) *Attorney, Agent, or Firm*—Rabin & Berdo, PC

(57) ABSTRACT

A foldable cellular phone includes a first housing, a first protruding portion, a second housing, and a second protruding portion. The first housing includes a first hinge part, the first protruding portion being disposed on the first hinge part. The second housing includes a second hinge part, the second protruding portion being disposed in the second hinge part. The first hinge part and the second hinge part couple with each other as a hinge. When the second housing rotates around the hinge relatively to the first housing, the second protruding portion corresponding to the first protruding portion is capable of acting as a stopper to stop the movement of the first protruding portion. Subsequently, the second housing is in a flip position with a predetermined maximum angle.

15 Claims, 8 Drawing Sheets

FOLDABLE CELLULAR PHONE

This application claims the benefit of Taiwan application Ser. No. 93110140, filed Apr. 12, 2004, the subject matter of which is incorporated herein by reference.

BACKGROUND OF THE INVENTION

1. Field of the Invention

The invention relates in general to an electronic device, and more particularly to a foldable electronic device.

2. Description of the Related Art

With the rapid development in science and technology in recent years, the size of electronic device has the tendency of miniaturization. A foldable cellar phone which is handy and portable can be said to be the typical one of foldable electronic devices.

Referring to FIG. 1A, an arrangement of a stopper in a conventional foldable electronic device is shown. A foldable electronic device 100 includes a main body 102, a flip cover 104 and a rotation device 106. The flip cover 104 and main body 102 are pivotally connected together via the rotation device 106. That is, the flip cover 104 can rotate against the main body 102 by means of the rotation device 106. The maximum flip angle that the flip cover 104 can rotate against the main body 102 is determined according to how the pair of stoppers 108a and 108b, disposed on one side of the main body 102, protrude from the main body 102.

Please refer to both FIG. 1B and FIG. 1C. FIG. 1B is a diagram showing the status when the stopper 108b of a conventional foldable electronic device protrudes from the main body, while FIG. 1C is a diagram showing another status when the stopper 110 of a conventional foldable electronic device protrudes from the main body.

The flip cover 104 rotates and flips against the main body 102 via the rotation device 106. When the stopper 108b or the stopper 110 stops the movement of the flip cover 104, the flip cover 104 will stop at a maximum flip angle.

As shown in FIG. 1B and FIG. 1C, the difference between the stopper 108b and the stopper 110 lies in the external design of protruding from the main body 102, so the maximum flip angle that the flip cover 104 could flip will differ accordingly.

Since the stopper 110 is different in external design, the maximum flip angle $\theta 1$ of the flip cover 104 as shown in FIG. 1B will be larger than the maximum flip angle $\theta 2$ of the flip cover 104 as shown in FIG. 1C.

Referring to FIG. 2, another arrangement of the stopper of the conventional foldable electronic device is shown. Foldable cellar phone 200 includes a main body 202, a flip cover 204 and a rotation device 206. The flip cover 204 and main body 202 are coupled together via the rotation device 206.

A pair of stopper 208a and 208b of the foldable electronic device 200 are disposed on one side of the flip cover 204, and are different from the position on which stopper 108a and 108b of the foldable electronic device 100 of FIG. 1A are disposed on the main body 102.

When the flip cover 204 rotates and flips against the main body 202, the stoppers 208a, 208b disposed on one side of the flip cover 204 can stop the movement of the flip cover 204, so the flip cover 204 can be positioned at a predetermined maximum flip angle. The magnitude of the maximum flip angle is determined according to how the pair of stoppers 208a and 208b protrude from the flip cover 204.

In the above-mentioned conventional foldable electronic devices, the maximum flip angle of the flip cover is determined by where the stopper is arranged, i.e., disposed on the main body or the flip cover.

Consequently, the maximum flip angle that the flip cover rotates against the main body will be restricted by the external design of the stopper. Moreover, after a long term operation, collision between the flip cover and the main body makes the flip cover or the main body peels its coating off easily, noise is also generated.

SUMMARY OF THE INVENTION

It is therefore an object of the invention to provide a foldable electronic device. The flip angle of the foldable electronic device of the invention not restricted by the external arrangement of the stopper of the foldable electronic device when the flip cover rotates and flips against the main body. Moreover, the flip cover or the main body of the foldable electronic device will not easily peel off its coating when the flip cover flips against the main body. There will be free of noise even when collision occurs between the flip cover and the main body.

The invention achieves the above-identified object by providing a foldable electronic device having a first housing, a first protruding portion, a second housing, a second protruding portion and a pivotal connection. The first housing has a first hinge part on which a first protruding portion is disposed. The second housing has a second hinge part, and the second housing can rotate against the first housing via the pivotal connection between the second hinge part and the first hinge part. The second protruding portion is disposed on the second hinge part and corresponds to the first protruding portion of the first hinge part. When the second housing rotates against the first housing, the first protruding portion of the first hinge part stops the movement of the second protruding portion of the two hinge parts for the second housing to be positioned at a flip angle.

In the foldable electronic device of the above invention, the first protruding portion, the first hinge part and the first housing can be a formed-in-one-block structure. While the second protruding portion, the second hinge part and the second housing can be a formed-in-one-block structure as well.

Besides, in the foldable electronic device of the above invention, the first hinge part can have a shaft on which the first protruding portion is disposed, while the second hinge part can have an axle hole on which the second protruding portion is disposed. The second hinge part and the first hinge part are pivotally connected via the matching of the axle hole and the shaft, and the second housing can rotate against the first housing around the shaft.

Moreover, in the foldable electronic device of the above invention, the flip angle is determined according to the position of the first protruding portion as disposed on the shaft, and the position of the second protruding portion as disposed inside the axle hole. On the other hand, a third protruding portion can be disposed inside the axle hole, the axle hole and shaft can be closely jointed via the third protruding portion for the second housing to rotate against the first housing.

According to another object of the invention, a pivotal joint including a first hinge part, a first protruding portion, a second hinge part and a second protruding portion is provided. The first hinge part has a shaft on which a first protruding portion is disposed. The second hinge part has an axle hole on which a second protruding portion is disposed.

Via the pivotal connection between the axle hole and the above shaft, the second hinge part can rotate against the hinge part. When the second hinge part rotates against the hinge part to a maximum predetermined angle, the first protruding portion on the shaft can stop the second protruding portion inside the axle hole. Therefore, the first hinge part and the second hinge part are relatively stopped and positioned.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1A:
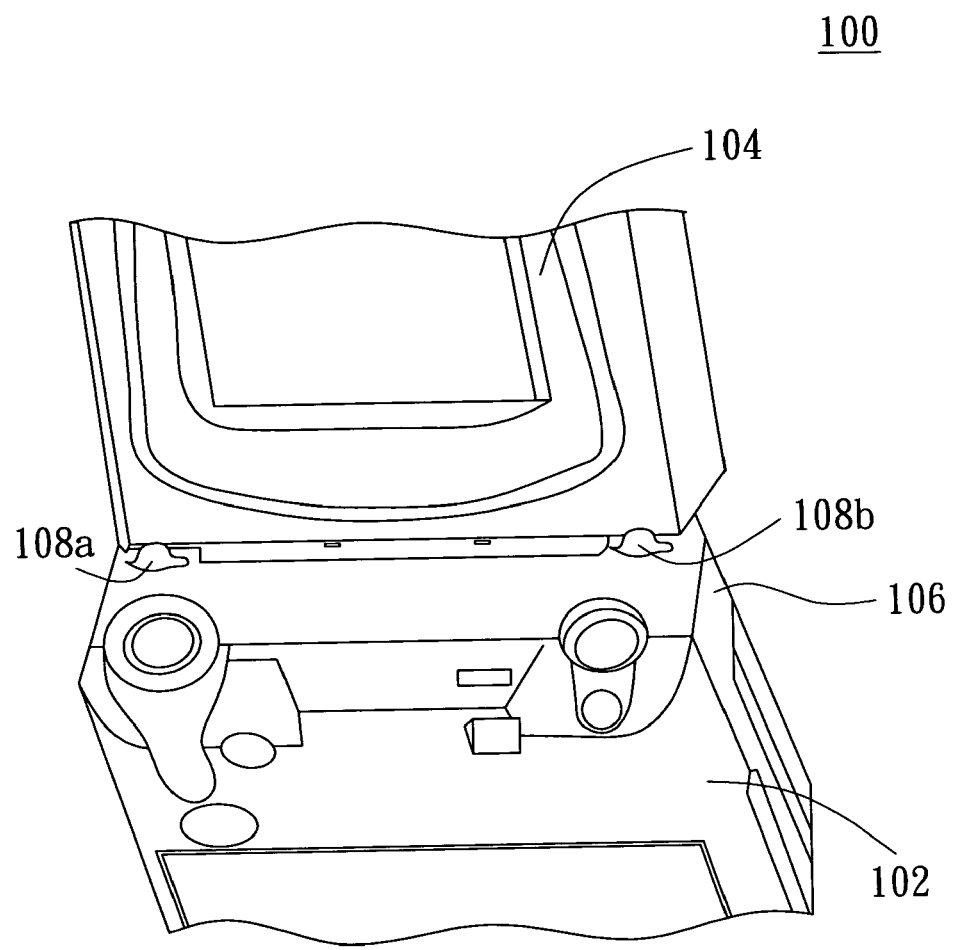
FIG. 1A is a diagram of the stopper arrangement of a conventional foldable electronic device.
Figure 1B:
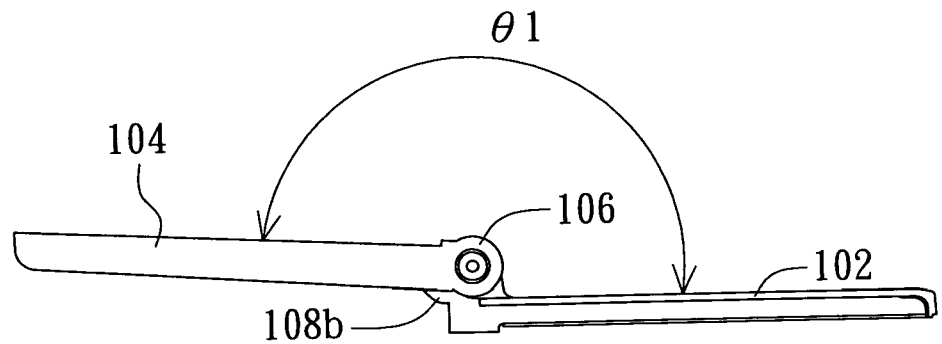
FIG. 1B is a diagram showing the rotation of the flip cover is ultimately stopped by the stopper located on the main body of a conventional foldable electronic device.
Figure 1C:
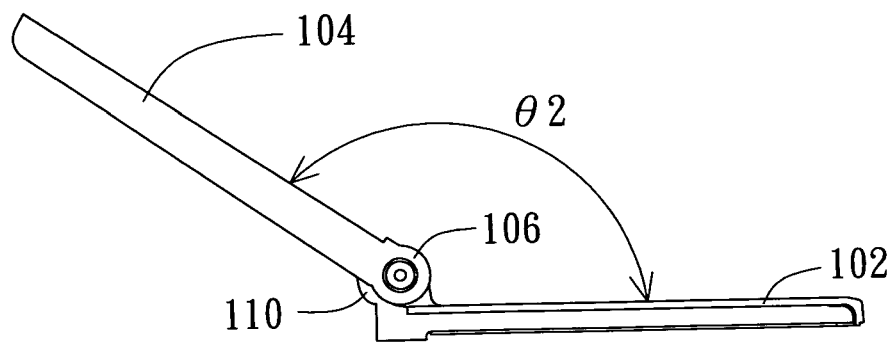
FIG. 1C is a diagram showing a smaller maximum opening angle of the flip cover due to different external design of the stopper.
Figure 2:
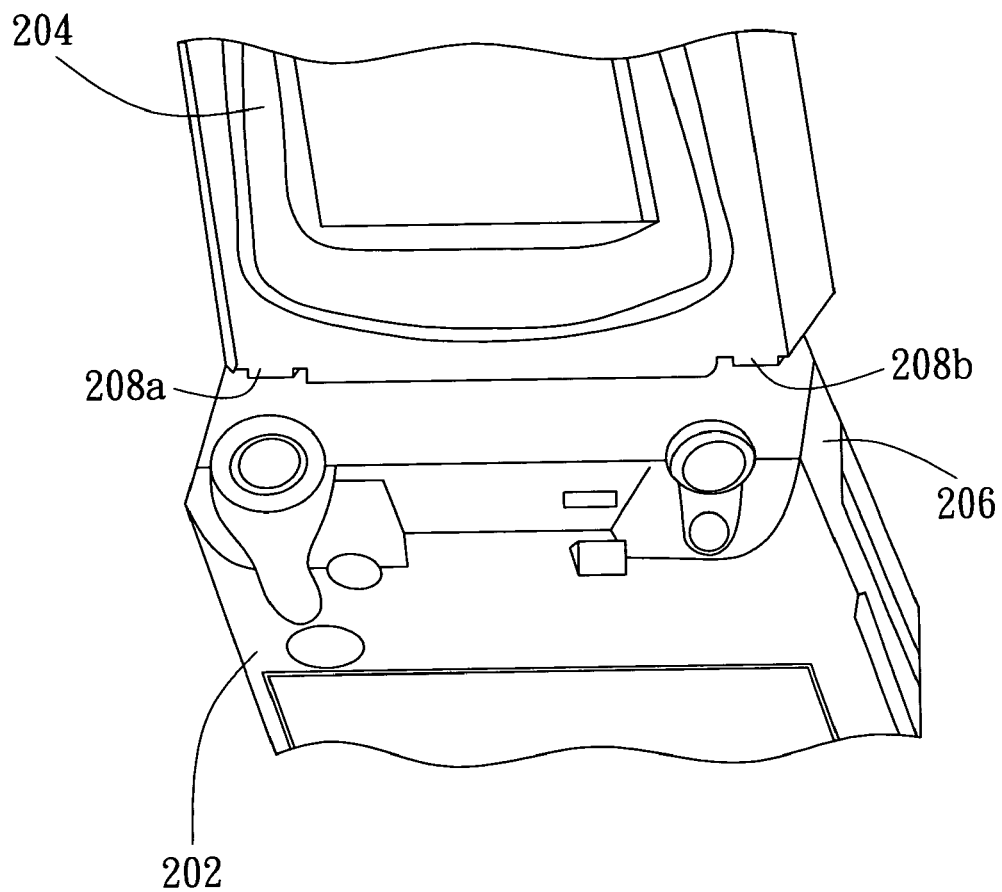
FIG. 2 is another diagram of the stopper disposed in the flip cover of a conventional foldable electronic device.
Figure 3A:
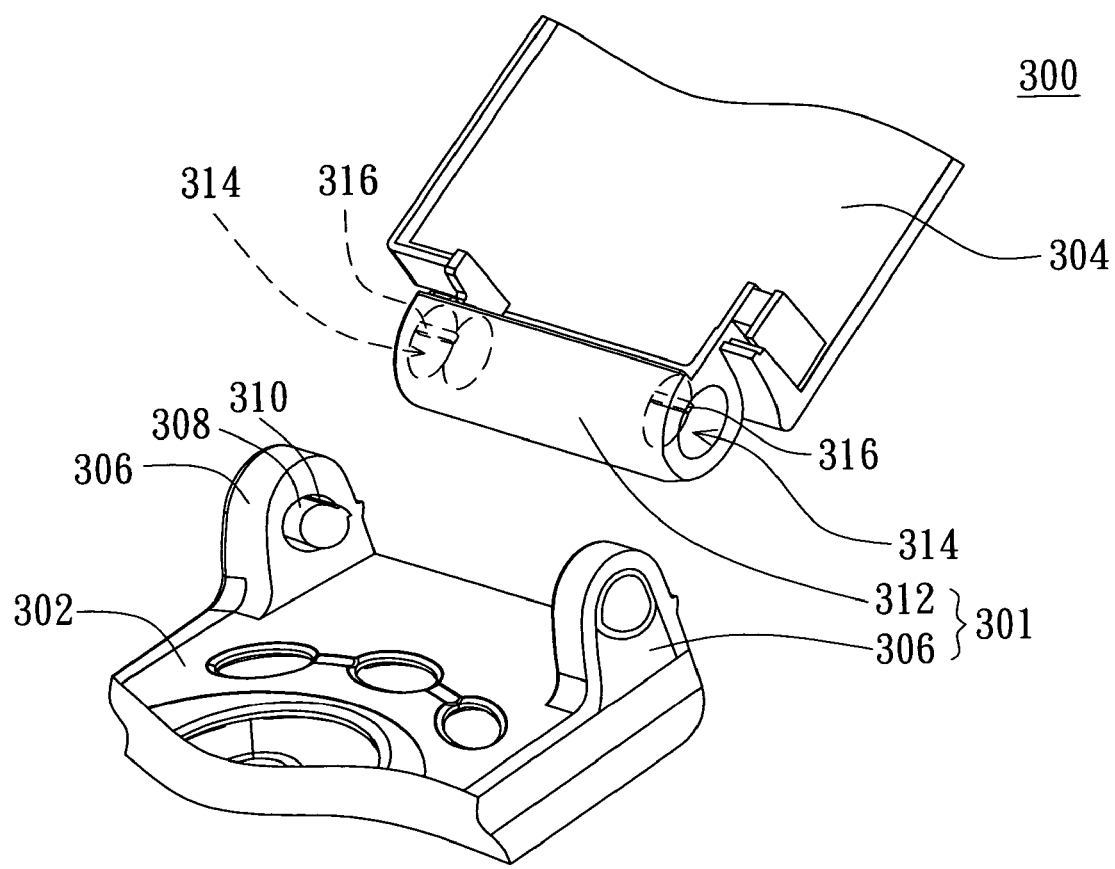
FIG. 3A is a decomposition diagram of the pivotal joint of the foldable electronic device according to a preferred embodiment of the invention.

Referring to FIG. 3A, a decomposition diagram of the pivotal joint of the foldable electronic device according to a preferred embodiment of the invention is shown. The foldable electronic device 300 includes a first housing, a pivotal joint 301 and a second housing. For the purpose of illustration, the first housing in the present preferred embodiment can be, for example, a main body 302, while the second housing can, for example, be a flip cover 304. However, the scope of protection is not limited thereto. Moreover, the foldable electronic device 300 of the present preferred embodiment can be a communication device such as a notebook computer or a personal digital assistant (PDA).

The pivotal joint 301 includes a first hinge part 306 and a second hinge part 312. The first hinge part 306 is disposed on the main body 302, while the second hinge part 312 is disposed on the flip cover 304. The first protruding portion 310 is disposed on the first hinge part 306 of the main body 302. The second protruding portion 316 is disposed on the second hinge part 312 of the flip cover 304, while the second protruding portion 316 corresponds to the first protruding portion 310 of the first hinge part 306.

Via the pivotal joint 301 formed by the first hinge part 306 and the second hinge part 312, the flip cover 304 can rotate against the main body 302. When the flip cover 304 rotates against the main body 302, the first protruding portion 310 of the first hinge part 306 can stop the movement of the second protruding portion 316 of the second hinge part 312 and thus stop the flip cover 304 at a maximum flip angle a (not shown in the diagram). That is, the second protruding portion 316 has the same effect as the stopper and positioning device.

Figure 3B:
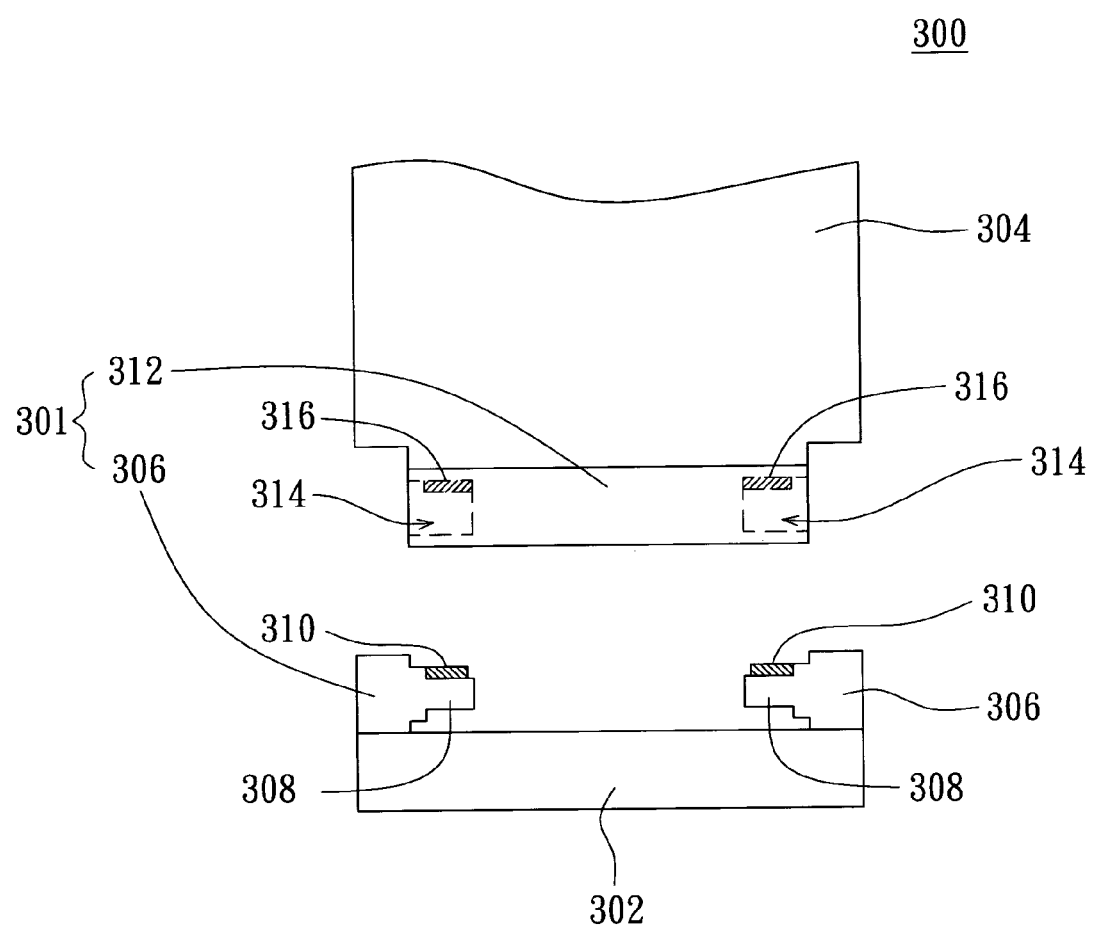
FIG. 3B is the decomposition diagram of the pivotal joint in another angle according to a preferred embodiment of the invention.

Referring to FIG. 3B, the pivotal joint in another angle of the foldable electronic device according to a preferred embodiment of the invention is shown. In practice, as shown in FIG. 3B, the first hinge part 306 and the second hinge part 312 are respectively disposed and pivotally jointed to make the flip cover 304 rotate against the main body 302.

Figure 4:
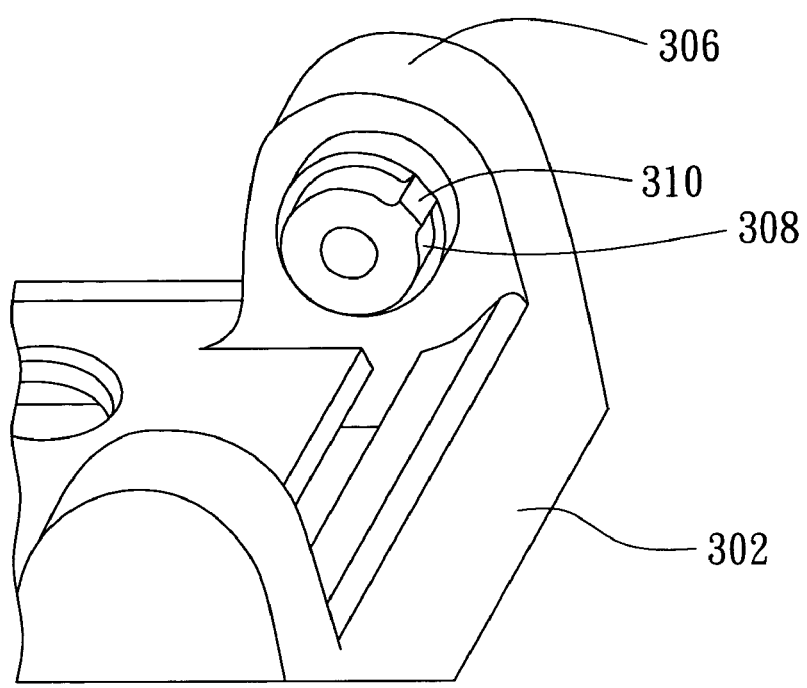
FIG. 4 is a partial diagram of the main body of the foldable electronic device according to a preferred embodiment of the invention.
Figure 5:
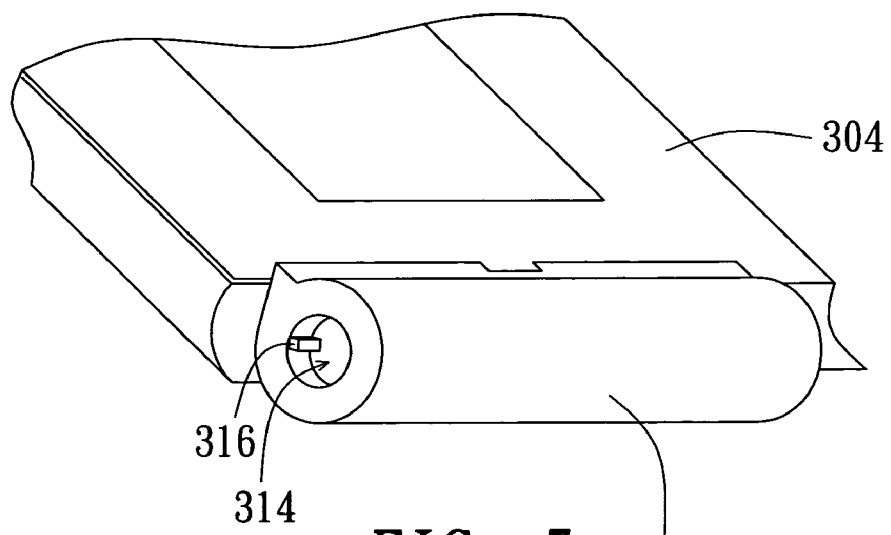
FIG. 5 is a partial diagram of the flip cover of the foldable electronic device according to a preferred embodiment of the invention.

To clearly understand the pivotal connection between the main body 302 and the flip cover 304 as well as the position after the flip cover 304 rotates against the main body 302, please refer to FIG. 4 and FIG. 5. FIG. 4 is a partial diagram of the main body of the foldable electronic device according to a preferred embodiment of the invention, while FIG. 5 is a partial diagram of the flip cover of the foldable electronic device according to a preferred embodiment of the invention.

In FIG. 4, the shaft 308 with steps is disposed inside the first hinge part 306 of the main body 302, while the first protruding portion 310 is disposed on the shaft 308. In a preferred practice, the first protruding portion 310 can be a cylinder.

In FIG. 5, the second hinge part 312 of the flip cover 304 has an axle hole 314 corresponding to the shaft 308 of FIG. 4. The diameter of the axle hole 314 is slightly larger than the outer diameter of the shaft 308, so the first hinge part 306 can be cupped into the axle hole 314 of the second hinge part 312 via the shaft 308 to form a pivotal joint 301 by the first hinge part 306 and the second hinge part 312. Via the pivotal connection between the axle hole 314 and the shaft 308, the first hinge part 306 can rotate against the second hinge part 312 to make the flip cover 304 rotate against the main body 302.

Besides, the second protruding portion 316 is disposed inside the axle hole 314. The second protruding portion 316 serves as a stopper to stop the first protruding portion 310. That is, when the second hinge part 312 rotates against the first hinge part 306 to a maximum predetermined angle, the first protruding portion 310 is stopped rotating by the second protruding portion 316. That is, the flip cover 304 will stop rotation and will be positioned to a maximum flip angle a relative to the main body 302 (as shown in FIG. 6).

Moreover, the maximum predetermined angle that the second hinge part 312 rotates against the first hinge part 306 is determined according to the relative position between the first protruding portion 310 disposed on the shaft 308 and the second protruding portion 316 disposed inside the axle hole 314. For example, if the first protruding portion 310 is disposed on the shaft 308 with an increase of 5 degrees of angular displacement away from the second protruding portion 316, while the position of the second protruding portion 316 as disposed inside the axle hole 314 remains unchanged, the second hinge part 312 can rotate 5 more degrees against the first hinge part 306. Consequently, the maximum flip angle a that the flip cover 304 can rotate against the main body 302 can increase an angular displacement of 5 degrees.

Relatively, if the second protruding portion 316 is disposed on the lateral side of the axle hole 314 with an increase of 5 degrees of angular displacement away from the first protruding portion 310, while the position of the first protruding portion 310 as disposed on the shaft 308 remains unchanged, the maximum flip angle a between the main body 302 and the flip cover 304 will increase by 5 degrees. Therefore, the positioning mechanism of the invention can precisely control the required angle for the flip cover 304 to be flipped and positioned.

Figure 6:
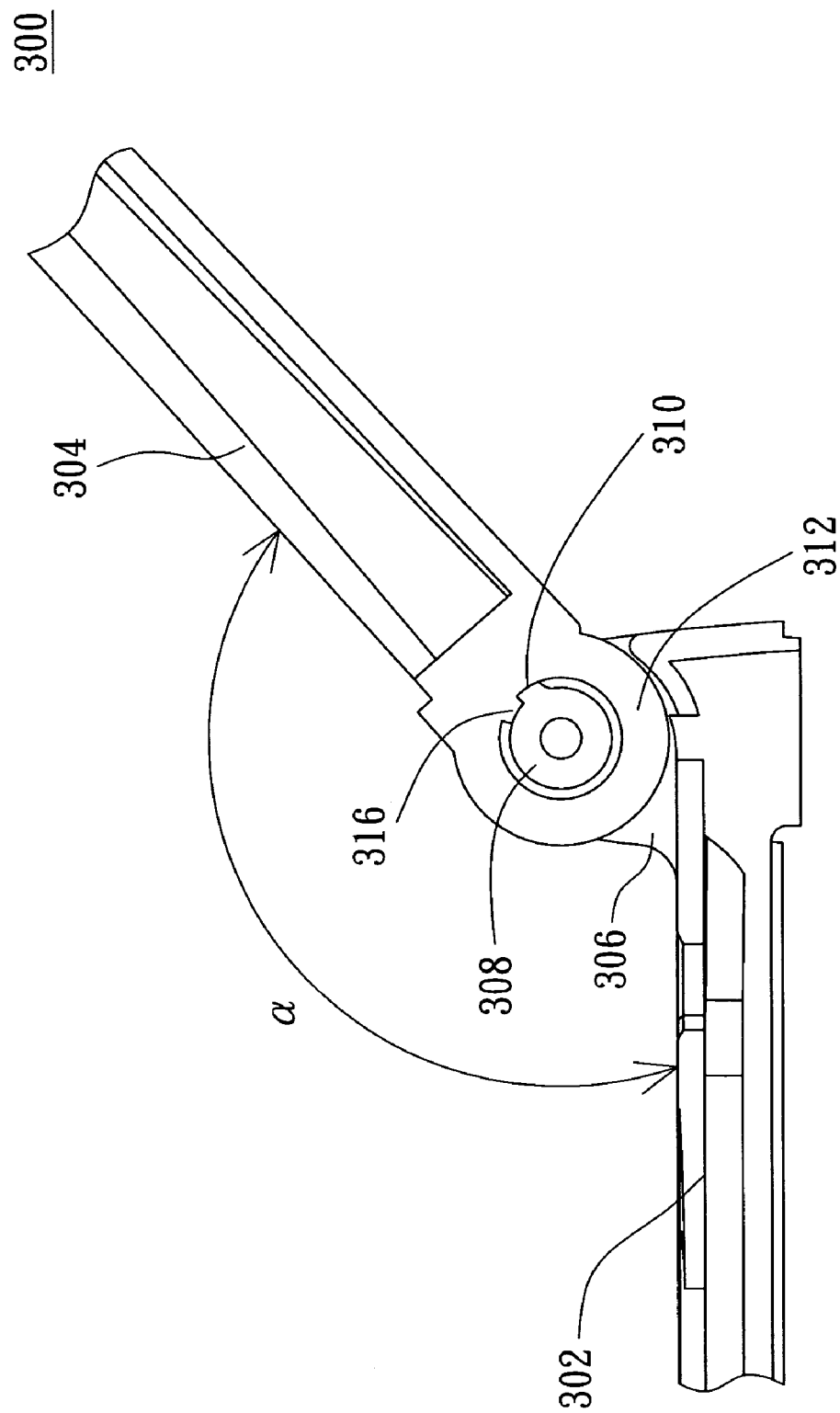
FIG. 6 is a partial cross-sectional view of the foldable electronic device according to a preferred embodiment of the invention.

Referring to FIG. 6, a partial cross-sectional view of the foldable electronic device according to a preferred embodiment of the invention is shown. When rotating against the main body 302, the flip cover 304 will be relatively positioned to a maximum flip angle a by the main body 302 because the movement of the second protruding portion 316 disposed on the flip cover 304 is stopped by the first protruding portion 310 disposed inside the main body 302.

Figure 7:
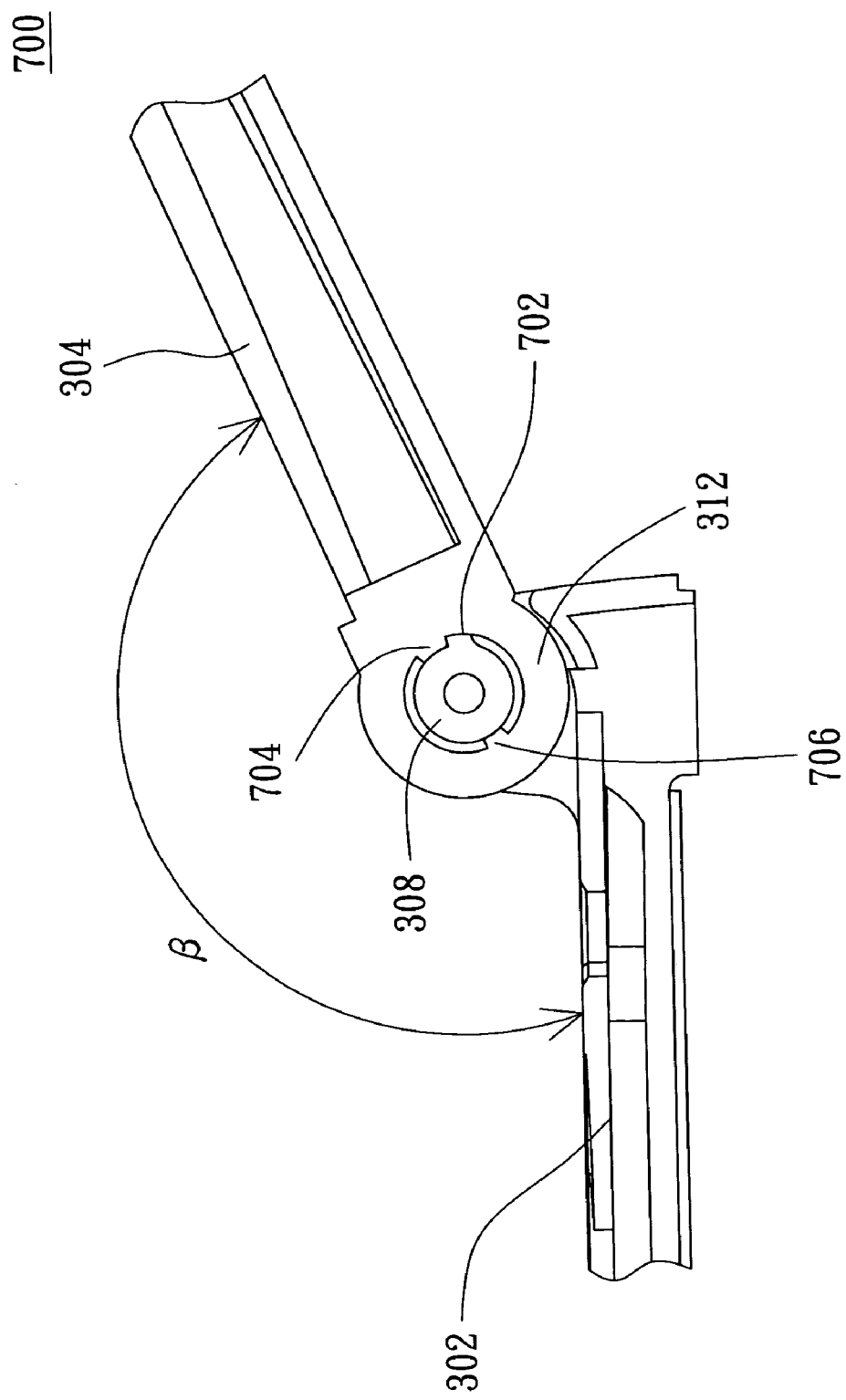
FIG. 7 is a partial cross-sectional view of another foldable electronic device according to a preferred embodiment of the invention.

Referring to FIG. 7, a partial cross-sectional view of a foldable electronic device according to another preferred embodiment of the invention is shown. The foldable electronic device 700 according to the present preferred embodiment differs from the prior preferred embodiment in that a first protruding portion 702 and a second protruding portion 704 are disposed on different positions. Moreover, the foldable electronic device 700 according to the present preferred embodiment further includes a third protruding portion 706. The third protruding portion 706 is disposed on a lateral wall of the axle hole 314. With the additional third protruding portion 706, the axle hole 314 can be even closely cupped with the shaft 308 for the second hinge part 312 to rotate against the first hinge part 306 even firmly. In other words, the flip cover 304 can rotate against the main body 302 even firmly.

The change the disposition of the first protruding portion 702 or the second protruding portion 704 will adjust the maximum flip angle. The maximum flip angle β, as shown in FIG. 7, is larger than the maximum flip angle a as shown in FIG. 6.

In order to reduce the cost of mold production, the first protruding portion 310, the shaft 308, the first hinge part 306 and the main body 302 can be formed in one block. Since the external design and position of the first protruding portion 310 could be formed by the mold before mold injection, no extra cost will be required for the first protruding portion 310 to be embedded into the shaft 308. Similarly, the second protruding portion 316, the second hinge part 312 and the flip cover 304 can be manufactured using a formed-in-one-block structure.

The foldable electronic device of the invention uses the first protruding portion and the second protruding portion respectively disposed inside the main body and the flip cover to serve as stoppers when the flip cover rotates and flips against the main body. The maximum flip angle of the foldable electronic device can be therefore precisely controlled and is not restricted by the external design of the main body and the flip cover. On the other hand, the foldable electronic device of the invention can solve the collision problem between the foldable electronic device flip cover and main body, preventing the flip cover and the main body from peeling or cracking due to collision, which usually occurs in the conventional foldable electronic device. Moreover, the first protruding portion and the second protruding portion respectively disposed inside the flip cover and the main body can effectively reduce the noise caused by the fraction therebetween, because the flip cover is stopped and positioned inside the foldable electronic device and the noise generated can be effectively contained within.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A foldable electronic device, comprising:
   a first housing having a first hinge part;
   a first protruding portion disposed on the first hinge part;
   a second housing having a second hinge part, wherein the second housing can rotate against the first housing via a pivotal connection between the second hinge part and the first hinge part; and
   a second protruding portion disposed on the second hinge part, wherein the second protruding portion corresponds to the first protruding portion of the first hinge part;
   wherein when the second housing rotates against the first housing, the first protruding portion of the first hinge part can stop a movement of the second protruding portion of the second hinge part for the second housing to be positioned at a maximum flip angle.

2. The foldable electronic device according to claim 1, wherein the first protruding portion, the first hinge part and the first housing are formed in one block.

3. The foldable electronic device according to claim 1, wherein the second protruding portion, the second hinge part and the second housing are formed in one block.

4. The foldable electronic device according to claim 1, wherein the first hinge part has a shaft on which the first protruding portion is disposed the second hinge part has an axle hole in which the second protruding portion is disposed, the second hinge part and the first hinge part are pivotally connected via a joint between the axle hole and the shaft, and the second housing can rotate against the first housing around with the shaft.

5. The foldable electronic device according to claim 4, wherein the maximum flip angle is determined according to a relative position between the first protruding portion as disposed on the shaft and the second protruding portion as disposed inside the axle hole.

6. The foldable electronic device according to claim 4, wherein the axle hole has a third protruding portion disposed therein, via which the axle hole can be closely jointed with the shaft so that the second housing can rotate against the first housing firmly.

7. A foldable electronic device, comprising:
   a main body having a shaft;
   a first protruding portion disposed on the shaft;
   a flip cover having an axle hole, wherein the flip cover and the main body are rotatable against each other via a pivotal connection between the axle hole and the shaft; and
   a second protruding portion disposed inside the axle hole;
   wherein when the flip cover rotates against the main body, the first protruding portion of the shaft can stop a movement of the second protruding portion of the axle hole for the flip cover to be positioned at a maximum flip angle.

8. The foldable electronic device according to claim 7, wherein the first protruding portion, the shaft and the main body are formed in one block.

9. The foldable electronic device according to claim 7, wherein the second protruding portion and the flip cover are formed in one block.

10. The foldable electronic device according to claim 9, wherein the maximum flip angle is determined according to a relative position between the first protruding portion as disposed on the shaft and the second protruding portion as disposed on the axle hole.

11. The foldable electronic device according to claim 9, wherein the axle hole has a third protruding portion disposed therein, via which the axle hole can be closely jointed with the shaft so that the flip cover can rotate against the main body firmly.

12. A pivotal joint, comprising:
a first hinge part having a shaft;
a first protruding portion disposed on the shaft;
a second hinge part having an axle hole, wherein the second hinge part can rotate against the first hinge part via a pivotal connection between the axle hole and the shaft; and
a second protruding portion disposed inside the axle hole;
wherein when the second hinge part rotates against the first hinge part to a maximum predetermined angle, the first protruding portion disposed on the shaft can stop the second protruding portion disposed inside the axle hole to stop rotating.

13. The pivotal joint according to claim 12, wherein the maximum predetermined angle is determined according to a relative position between the first protruding portion as disposed on the shaft and the second protruding portion as disposed inside the axle hole.

14. The pivotal joint according to claim 12, wherein the axle hole has a third protruding portion disposed therein, via which the axle hole and the shaft are closely jointed for the second hinge part to rotate against the first hinge part firmly.

15. The pivotal joint according to claim 12, wherein the first hinge part is disposed on the a first housing while the second hinge part is disposed on a second housing, wherein the first housing and the second housing can rotate relatively to a maximum flip angle via the pivotal connection between the first hinge part and the second hinge part.

* * * * *